(12) United States Patent
Reynolds et al.

(10) Patent No.: US 10,866,946 B1
(45) Date of Patent: Dec. 15, 2020

(54) CONTENT AGGREGATION AND AUTOMATED ASSESSMENT OF NETWORK-BASED PLATFORMS

(71) Applicant: Electronic Arts Inc., Redwood City, CA (US)

(72) Inventors: Joshua Neal Reynolds, Cedar Park, TX (US); Dana Elaine Baldwin, Cedar Park, TX (US); Gabriel Alejandro Sandoval, Hot Springs, AR (US); Michael Garrett Jones, Cedar Park, TX (US); Nikhil Mohan Joshi, Maharashtra (IN); Siddhartha Sharma, Austin, TX (US); Amit Mittal, Maharashtra (IN); Donovan Lee Gentry, Austin, TX (US); Mary Jane Redmond Hawes, Austin, TX (US)

(73) Assignee: ELECTRONIC ARTS INC., Redwood City, CA (US)

( * ) Notice: Subject to any disclaimer, the term of this patent is extended or adjusted under 35 U.S.C. 154(b) by 1115 days.

(21) Appl. No.: 14/977,206

(22) Filed: Dec. 21, 2015

(51) Int. Cl.
  *G06F 16/23*  (2019.01)
  *H04L 12/58*  (2006.01)
  *G06F 16/9535*  (2019.01)
  *G06F 16/2457*  (2019.01)

(52) U.S. Cl.
  CPC ........ *G06F 16/2358* (2019.01); *G06F 16/235* (2019.01); *G06F 16/24578* (2019.01); *G06F 16/9535* (2019.01); *H04L 51/32* (2013.01)

(58) Field of Classification Search
  None
  See application file for complete search history.

(56) References Cited

U.S. PATENT DOCUMENTS

| 6,064,978 | A | 5/2000 | Gardner et al. |
| 7,159,011 | B1 | 1/2007 | Knight et al. |
| 8,038,535 | B2 * | 10/2011 | Jensen ............... G07F 17/32 463/42 |
| 8,972,428 | B2 | 3/2015 | Dicker et al. |
| 9,146,943 | B1 * | 9/2015 | Thakur .......... G06F 16/24578 |
| 2010/0162135 | A1 * | 6/2010 | Wanas .............. G06Q 10/10 715/753 |

* cited by examiner

*Primary Examiner* — Mark D Featherstone
*Assistant Examiner* — Ranjit P Doraiswamy
(74) *Attorney, Agent, or Firm* — Knobbe, Martens, Olson & Bear, LLP

(57) ABSTRACT

In some embodiments, the present disclosure provides a content aggregation and assessment computing system that can be configured to host a network-based content platform. For example, content generated can accumulate value based on defined metrics. The system can automatically track the submitted content's value over time. The accumulated value may be associated with a user's profile based on pre-defined criteria. The accumulated value may be used to calculate a ranking for user profile. The user profile ranking may correspond to increased status and/or privileges in the online community and access to secured portions of the platform.

20 Claims, 10 Drawing Sheets

CONTENT AGGREGATION AND AUTOMATED ASSESSMENT OF NETWORK-BASED PLATFORMS

BACKGROUND

In today's increasingly connected and digital world, online communities have increased in size, number, and popularity. Online communities can comprise platforms utilized by large numbers of users, and may include social networking sites, forums, message boards, online games, and so forth. Users in network-based communities can submit content to use these platforms to socialize, hold discussions, answer questions, play games, and share content.

SUMMARY OF EMBODIMENTS

The systems, methods and devices of this disclosure each have several innovative aspects, no single one of which is solely responsible for the desirable attributes disclosed herein. Details of one or more implementations of the subject matter described in this specification are set forth in the accompanying drawings and the description below.

In one embodiment, a content aggregation and assessment computing system comprising: an account data store storing a set of user profiles for a plurality of users, wherein each user profile is associated with a user; a rules data store storing a set of value calculation factors and a set of response criteria; and a content hosting platform comprising: at least one processor in electronic communication with the account data store and the rules data store; a content platform module comprising instructions that when executed by the at least one processor generate a network-based content platform associated with at least one game application; and a content valuation module comprising instructions that when executed cause the content hosting platform to: receive an initial content object generated by a first user, the first user associated with a first user profile of the set of user profiles; determine an initial value of the initial content object based, at least in part, on information associated with the first user profile and at least one value calculation factor of the set of value calculation factors; receive a response content object in response to the initial content object from a second user, wherein the second user is associated with a second user profile of the set of user profiles; determine a response value of the response content object and the at least one value calculation factor; update the initial value of the initial content object to generate an updated value, wherein the updated value is based at least in part on the initial value and the response value; determine whether the response content satisfies a response criteria associated with the first content object of the set of response criteria; and in response to determining that the response content satisfies the response criteria, associating the updated value to the second user profile.

In another embodiment, a computer-implemented method for automated assessment and valuation of content comprising: by a computing system configured to execute a network-based content platform, receiving a first content object generated by a first user, the first user associated with a first user profile; determining a content value of the first content object based, at least in part, on information associated with the first user profile and at least one value calculation factor; receiving at least one response content object in response to the first content object from at least one user different from the first user, wherein each response content object is associated with a user profile; for each of the at least one response content objects, determining a response value for the response content object based, at least in part, on the at least one value calculation factor; updating the content value of the first content object, based at least in part on the response value of the response content object, determining whether the response content object satisfies a response criteria associated with the first content object; and in response to determining that the response content satisfies the response criteria, assigning the content value of the first content object to the user profile associated with the response content object that satisfied the response criteria.

In another embodiment, a non-transitory computer readable medium comprising computer-executable instructions for content aggregation and assessment that, when executed by a computing system, causes the computer to: receive a first content object generated by a first user, the first user associated with a first user profile; determine a content value of the first content object based, at least in part, on information associated with the first user profile and at least one value calculation factor; receive at least one response content object in response to the first content object from at least one user different from the first user, wherein each response content object is associated with a user profile; for each of the at least one response content objects, determining a response value for the response content object based, at least in part, on the at least one value calculation factor; updating the content value of the first content object, based at least in part on the response value of the response content object, determining whether the response content object satisfies a response criteria associated with the first content object; and in response to determining that the response content satisfies the response criteria, assigning the content value of the first content object to the user profile associated with the response content object that satisfied the response criteria.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Online communities (for example, forums, message boards, social networking sites, and/or the like) can be utilized by a large number of members (hereinafter also referred to as "users"). Users of the online platform associated with the online community can submit content in order to socialize with other users, hold discussions between users, ask and answer questions with other users, organize events, play games, and/or the like. Because of the importance of user-created content to these communities, it can be desirable to create a platform architecture for hosting the online communication for implementing automated content analysis and tracking, as well as well as automated security measures for enabling electronic access to various secured portions of the platform. The platform architecture can also be used to incentivize users to create and submit content to the online platform.

In some embodiments, users may be awarded points or other types of incentives (hereinafter also collectively referred to as "points" or "point values") for creating and submitting content to the online platform. For example, when a user submits content to the online platform, the user's account may be credited a number of points based on a value determined for submitted content. The system can automatically track the submitted content's value over time, which can be used to credit a user's account based on pre-defined criteria. In some embodiments, a value of points that a user has accumulated may be used to calculate a ranking for user profile. The user profile ranking may correspond to increased status and/or privileges in the online community and access to secured portions of the platform.

Content Value Assignment System

Figure 1:
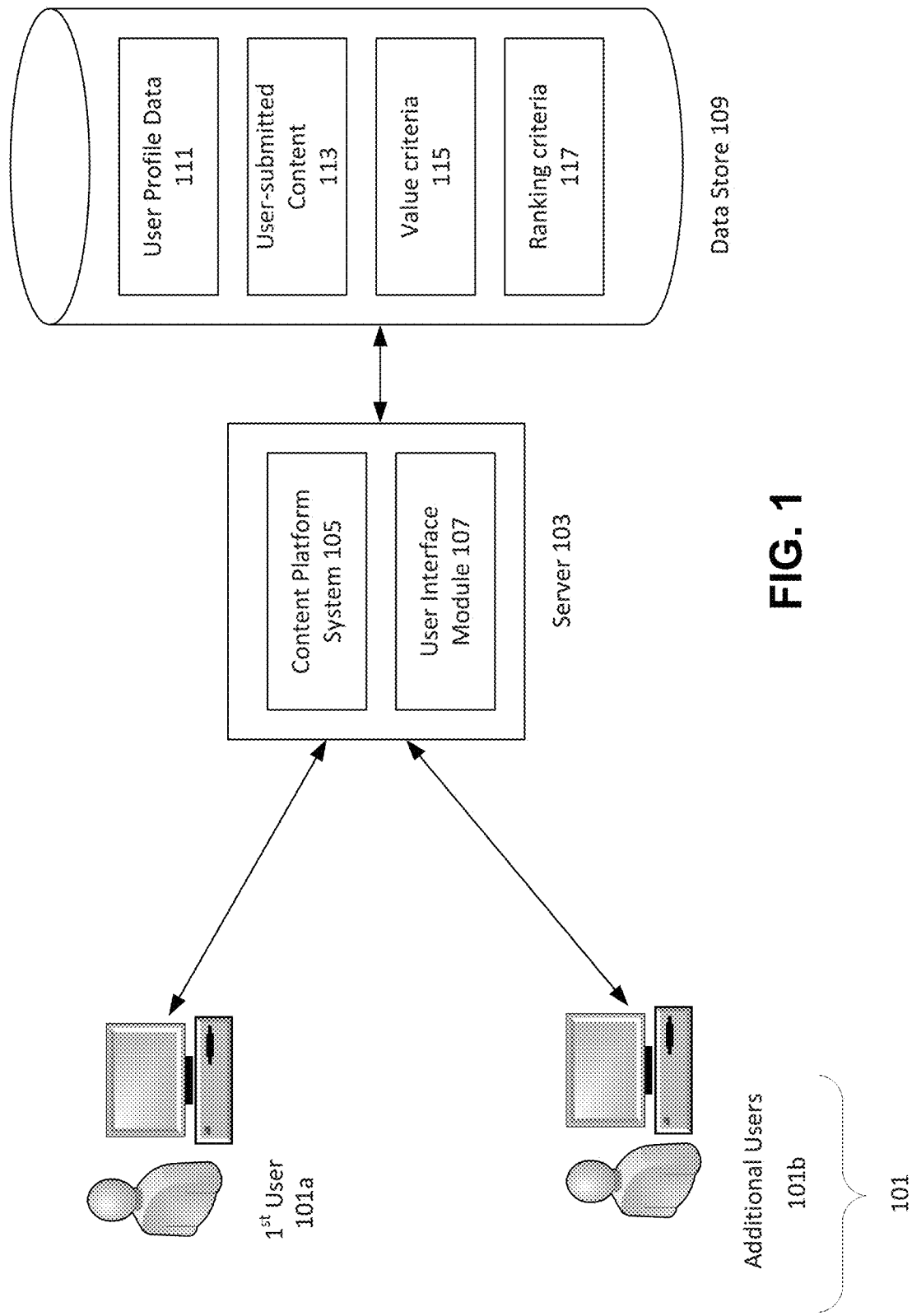
FIG. 1 illustrates a block diagram of an embodiment of a network-based system implementing an online community.

FIG. 1 illustrates a block diagram of an embodiment of a system implementing an online content platform. As shown in the embodiment of FIG. 1, a plurality of user computing devices 101 may electronically access a content platform 105 that can operate on a separate server or server system (for example, server 103) which can be in communication with and one or more data stores 109.

Figure 10:
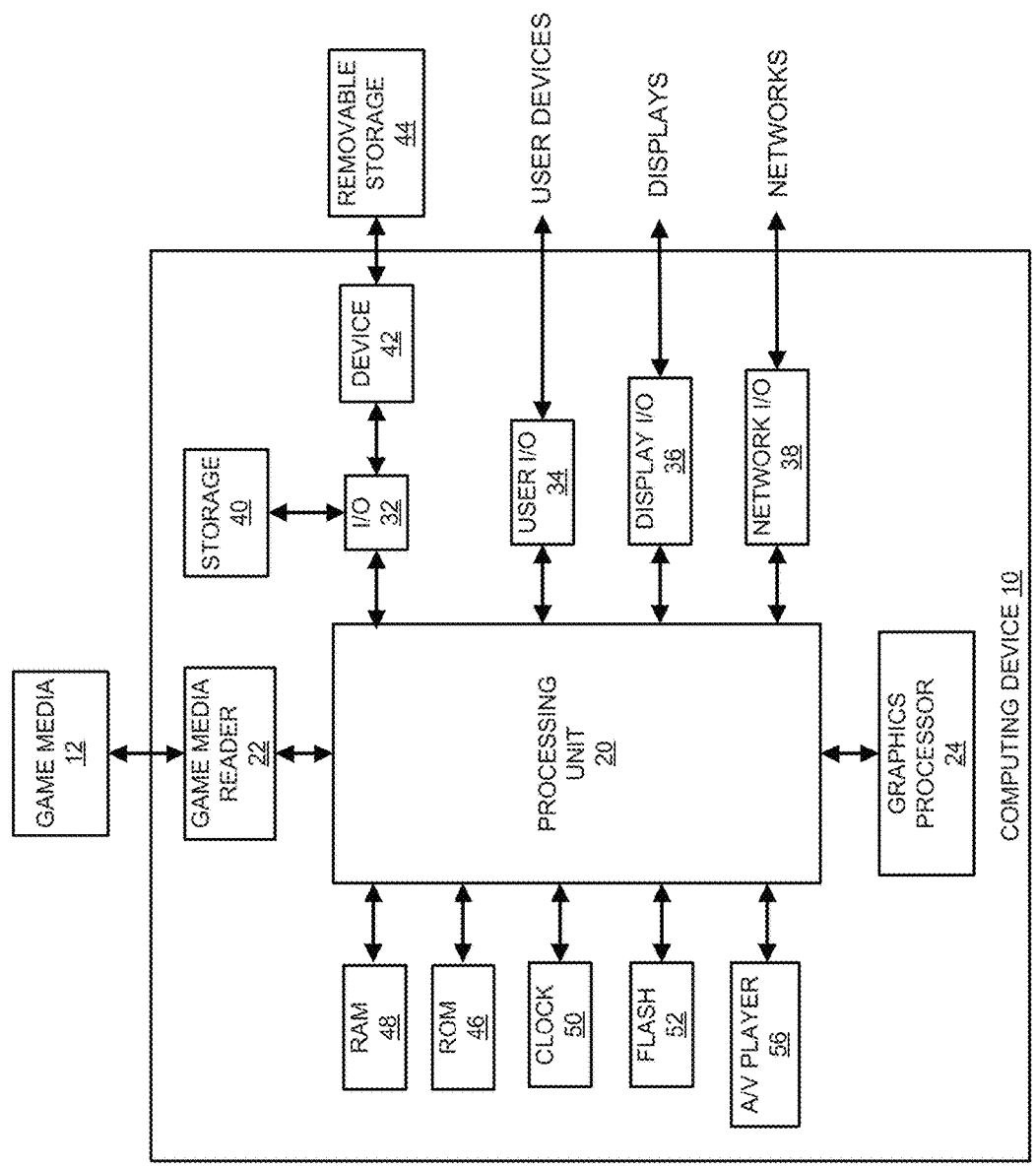
FIG. 10 is a block diagram that illustrates a computer system upon which an embodiment may be implemented.

The user computing devices 101 may correspond to a first user 101*a* and a plurality of additional users 101*b*. A user computing device 101 can correspond to any type of computing device or system that can be used to operate or interface with the content platform 105. Examples of such user computing devices include, for example, workstations, personal computers, game consoles, remote computing terminals, mobile devices, portable gaming consoles, smartphones, tablets, or touchscreen devices. A user computing device can comprise a display device, such as a display monitor, for displaying a user interface. User computing devices can also comprise one or more input devices for the user to provide operational control over the activities of the system, such as a mouse, keyboard, controller, or touchscreen to manipulate a graphical user interface to generate user inputs (for example, by manipulating a cursor or pointing object in the graphical user interface). An exemplary embodiment of a user computing device is illustrated in FIG. 10.

The exemplary content platform 105 comprises one or more software platforms accessible to a user at the user computing device 101. The content platform 105 can include a user interface module 107 that can be configured to output instructions to a user computing device 101 for displaying a user interface. The user interface can be configured to allow a user to input or manipulate content associated with content platform 105. In some embodiments, content platform 105 can be implemented as part of the same computing system as a user computing device 101, while in other embodiments, content platform 105 can run on a separate computing system (for example, on an application server) accessible by the user computing device 101 directly or through a network (not shown). For example, the content platform can be a web-based application or platform that is accessed over a network via a browser running on the user computing device 101 (for example, a website). In some embodiments, a user computing device 101 may be configured to execute client application (not shown) in order to access the content platform 105 on the server 103.

The content platform 105 can be configured to communicate with the data store 109 content data. In some embodiments, the content platform 105 can communicate with the data store 109 through a network (not shown), while in other embodiments, the content platform 105 can communicate with data store 109 local to the server 103.

Data stored in the data store 109 can include a variety of information and data, including user profile data 111, user-submitted content data 113, value criteria data 115, and ranking criteria data 117. User profile data 111 can include data relating to user profiles associated with users of the content platform 105 (for example, users 101*a*, 101*b*). The user profile data 111 may include information, such as, username information, user authentication information, user properties and statistics, security permissions, and/or the like.

User-submitted content data 113 can include content generated by one or more users 101 that access and use the content platform 105. The users may create and submit content to content platform 105, which may be stored as user-submitted content data 113. The user-submitted content may include text, posts, images, media, files, and/or other types of digital content.

Value criteria data 115 can include rules or criteria for calculating values, such as point values, that may be awarded to a user of the content platform 105. As further described below, the value criteria data 115 may divided between two or more data stores. The value criteria data 115 may be stored in a rules engine or the rules database. The point value can be rewarded in response to the submission or creation of content by the user. In some embodiments, in order to incentivize the creation of content by the users, users may be awarded point values for submitting content to the content platform 105 and/or responding to content submitted by other users. The point value of the content can be based upon a calculated value of the content, such as, for example, an aggregation of factors such as content type, a perceived demand for the content, and/or the like.

Ranking criteria data 117 can include rules or criteria for determining a ranking of a user profile on the content platform 105. As further described below, the ranking criteria data 117 may divided between two or more data stores. The ranking of a user profile can be based at least in part upon content that has been created or submitted by the user. In some embodiments, a user profile can acquire point values based on responses to content submitted by other users. A higher rank for a user profile may correspond to achievements or badges earned by the user, ranking of a specific aspect of the user profile, provide access to additional privileges, access to secured portions of the platform, and/or other features.

The data store 109 can include a Relational Database Management System (RDBMS) that stores the data as rows in relational tables. The term "data store" or "database," as used herein, can refer to a relational database (for example, RDBMS or SQL database), a non-relational database, or can refer to any other data structure, such as, for example a comma separated values (CSV), extensible markup language (XML), text (TXT) file, flat file, spreadsheet file, and/or any other widely used or proprietary format. While the user profile data 111, user-submitted content data 113, value criteria data 115, and ranking criteria data 117 are shown as part of a single data store 109, in some embodiments, the data can be stored on different data stores and/or on the same server computing system as the content platform 105. In some embodiments, the data store 109 can correspond to a plurality of databases, and/or span multiple servers or computing devices.

Value Assignment

Figure 2A:
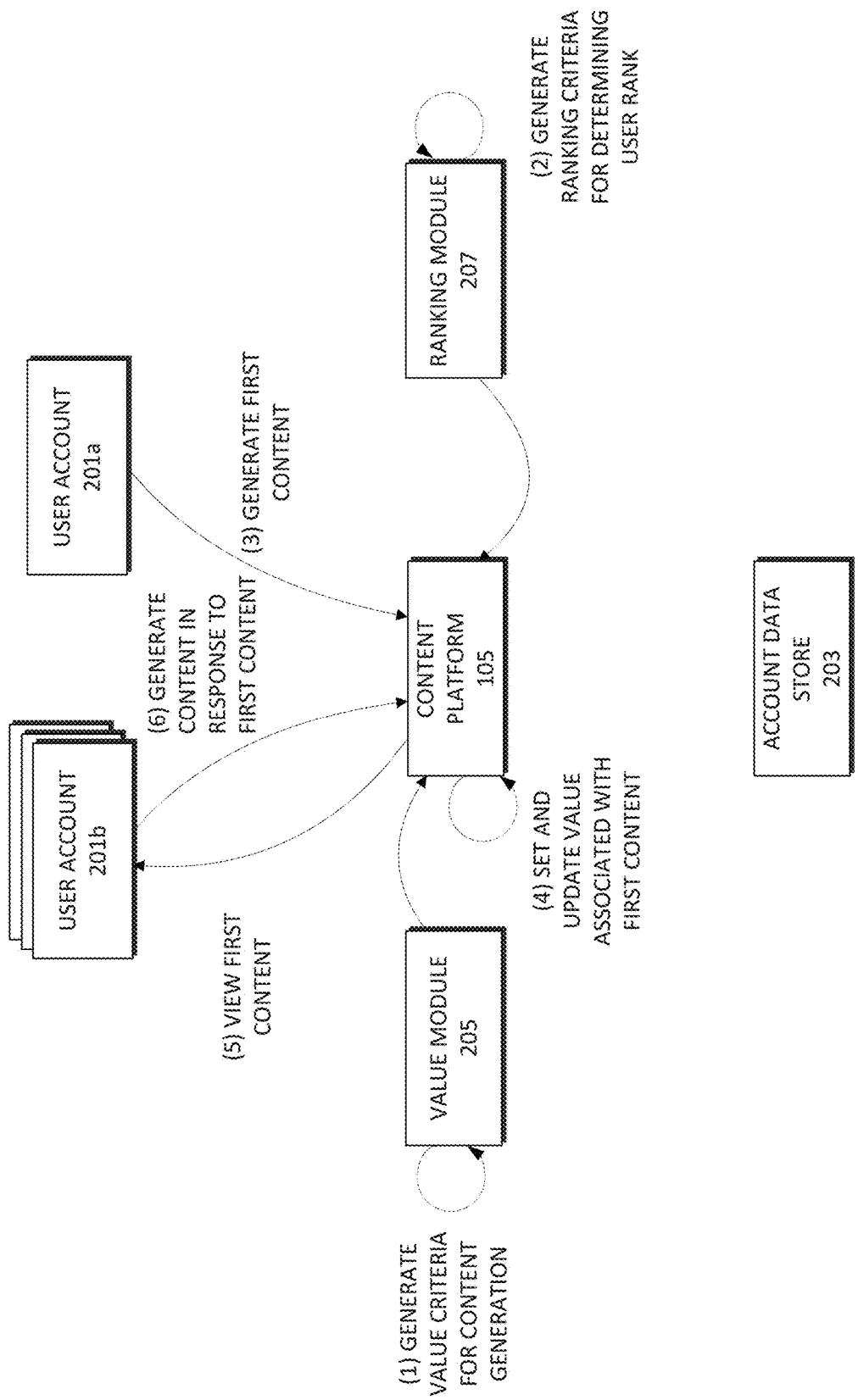
FIGS. 2A and 2B illustrate block diagrams of embodiments of interactions between a content platform and users.
Figure 2B:
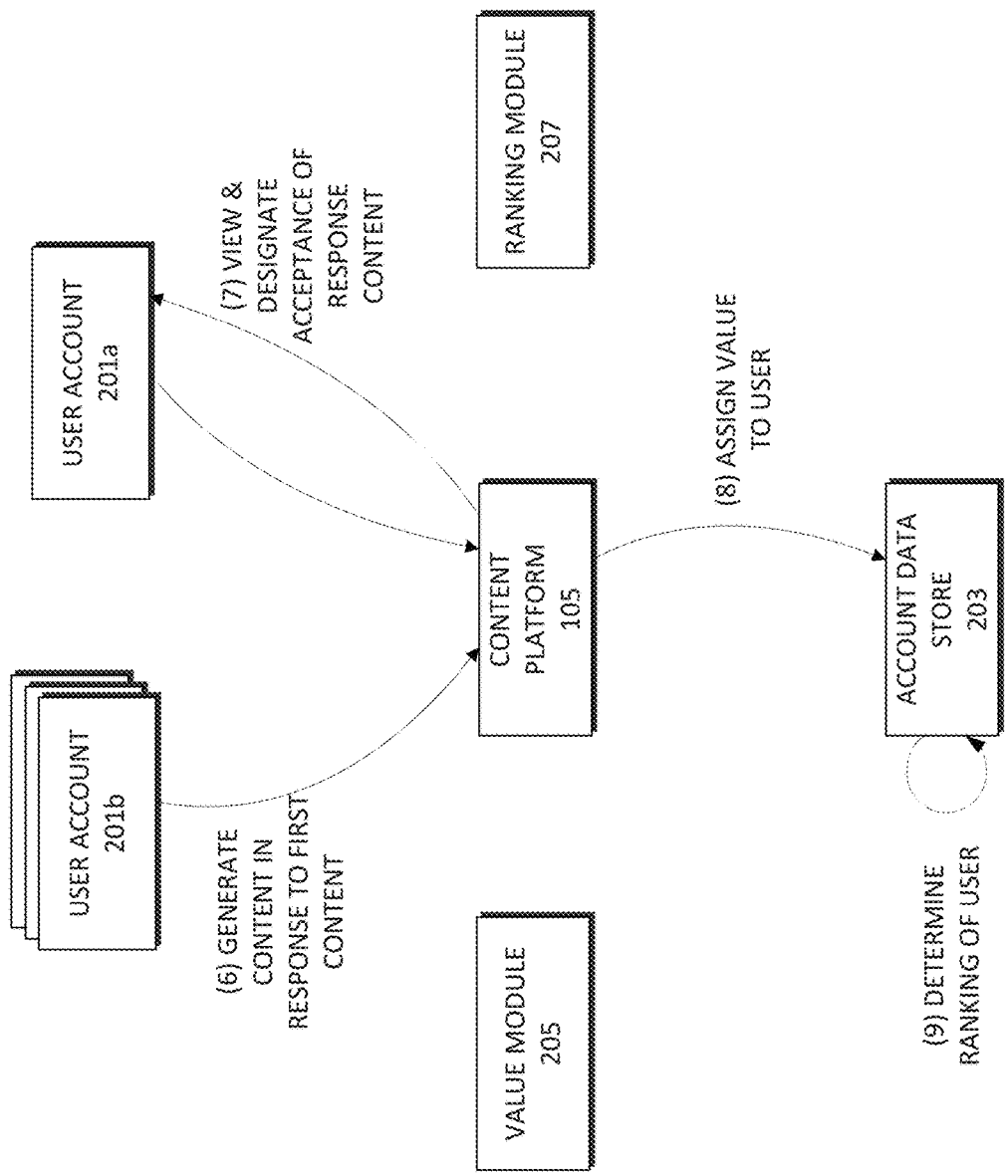

FIGS. 2A and 2B are block diagrams of embodiments illustrating various interactions between a content platform 105 and users 101. At (1), a value modulator can generate value criteria for calculating a value for content generated by a user to content platform 105. The generated value criteria may correspond to value criteria data 115 illustrated in FIG. 1. The value criteria for content may be based upon a plurality of different factors indicating a perceived demand for content, such as a type of the content and/or one or more properties of a request for the content. For example, the value criteria may specify a weighted sum of a plurality of factors associated with content on content platform 105. In some embodiments, different value criteria corresponding to different locations or taxonomy levels of content platform 105 may be generated.

At (2), a ranking module can generate ranking criteria for determining rankings for users of content platform 105. The generated ranking criteria may correspond to ranking criteria data 117 as illustrated in FIG. 1. The ranking criteria may comprise a function based upon one or more values associated with a user account (for example, user accounts 201a or 201b) stored in account data store 203.

At (3) a first user, such as user 101a, accesses the content platform 105 through a user account 201a and generates content objects for the content platform 105. In some embodiments, the content platform can comprise a forum or message board containing a plurality of topics or threads (hereinafter collectively referred to as threads). The creation of a thread, and responses thereto, can be considered generation of content objects posted to the platform. As such, the first user may generate the first content by creating a new thread on the forum. In some embodiments, the first content submitted by the first user at user account 201a to content platform 105 may comprise a request. For example, a user may post a thread posing a question or containing a request for a solution.

In some embodiments, in order to access and generate content for the content platform 105, the first user associated with user account 201a may first be authenticated. For example, the user may supply authentication information (for example, a username and a password) that is authenticated against authentication information stored in account data store 203. In some embodiments, account data store 203 may correspond to user profile data 111 as illustrated in FIG. 1.

At (4), in order to incentivize other users of the platform to submit content in response the first content, such as, for example, solution content for a question or request posed by the thread, a value may be associated the first content. The value can be awarded to another user, such as, for example, a user of additional users 101b accessing the content platform 105 through one of user accounts 201b, in response to the submission of content by the user in response to the first content. In some embodiments, values associated with content may be expressed in the form of "points," and may also be referred to as "point values."

When the first content is received at the content platform 105, the first content may be assigned an initial value. The initial value may comprise a default value (for example, 1 point). In some embodiments, the initial value may be automatically calculated as an aggregation of one or more factors. These factors may include a characteristic associated with the first content (for example, type of content a game application associate with the first content a location within the content platform associated with the first content, and/or the like), a characteristic associated with the first user (for example, a rank or status of the first user), and/or the like. For example, first content generated by a first user who is designated as a "VIP" may be given a higher initial value compared to a contest request by a user who is not a "VIP."

In addition, the value associated with the first content may be updated over time to reflect a perceived level of interest of users of the platform in receiving a content in response to the first content. For example, at (5), other users accessing the content platform 105 through other user accounts 201b may view the first content, and, at (6), generate content (hereinafter also referred to as "response content") in response to the first content. In response, the value associated with the first content may increase, reflecting an increasing level of interest in the first content by users of the platform. For example, where the first content corresponds to a thread on a message board or forum platform, other users may post additional content in the form of replies in response to the thread. In some embodiments, other users of the platform can express interest in thread in other ways, such as by indicating a "Like," a thumbs up, or a "me-too." Additional factors such as an age of the first content, a location of the first content, and/or the like may also be used to determine how the value associated with the first content increases or changes. Each of these factors may be weighted in different ways in order to determine the value associated with the first content. In some embodiments the original poster may provide an additional incentive value to incentivize other users to reply.

When another user posts response content that satisfies certain criteria response of the first content, the user may be awarded the accumulated value associated with the first content. For example, the response may include content that comprises a solution to a question or request posed by the first content. In some embodiments, in order for the content to satisfy the criteria, the first user, at (7) may view the response content and designate the content as "accepted." For example, the first user may mark the response content as "accepted" if the first user deems the content to be an adequate solution to a problem or request posed by the first content. In some embodiments, the response content can be accepted based upon inputs from users other than the first user. For example, if at least a threshold number of users accept the response content. If the response content is accepted, then content platform 105 may award the total value associated with the first content that has been accumulated to the user account 201b that provided the response content. In addition, the first content may be designated as "answered" and/or closed from receiving further response content, and may not accumulate additional point values. In some embodiments, the value associated with the first content may only be awarded to one user after the submission of solution content. In other embodiments, the point value associated with the thread may be awarded to or divided between multiple users for multiple pieces of response content. On the other hand, if the response content is not accepted, the point value is not awarded, and the content platform 105 may remain open to accepting further response content submissions from other users (at (6)) in response to the first content.

In some embodiments, an acceptance of the response content may be revoked. For example, the first user may indicate that the submitted response content is not satisfactory. Alternatively, the response content submitted may have been removed or quarantined by an administrator or moderator of the content platform. An open content there may continue to accept response content in response to the first content, and the point value associated with the first content may continue to accumulate and may later be awarded to another user for a different response content submission (for example, the first user may select a different piece of response content as accepted). In addition, the point value that was initially awarded may be rescinded. Alternatively, in some cases, the user may retain the awarded point values, even if the acceptance of the submitted response content is later rescinded.

At (8), the content platform 105 assigns the value associated with the first content to the user associated with the accepted response content. In some embodiments, this comprises transmitting the value to an account data store 203 containing data associated with the user accounts of the users of content platform 105.

At (9), in response to the user receiving the value associated with the first content, a ranking of the user may be determined or updated at the account data store 203. As users of the platform accumulate values from submitting content that satisfies different content requests, the accumulated values may be used to determine a user rank and/or user privileges of a user profile or allow access to various secured portions of the platform. The user profile ranking can be based on the ranking criteria generated at ranking module 207. The reward value may be aggregated with a ranking value stored in account data store 203 associated the user's account. The ranking values associated with the user profile may be based upon values associated with content previously submitted by the user. A ranking for the user can be calculated based upon the user's aggregated ranking value, as determined by the ranking criteria generated at (2) at ranking module 207. In some embodiments, the ranking of the user may also be based upon one or more additional factors. In some embodiments, the ranking of the user may be associated with a set of privileges available to the user (for example, being able to access certain functions of the content platform 105, being able to submit certain types of content, and/or the like).

Platform Interface

Figure 3:
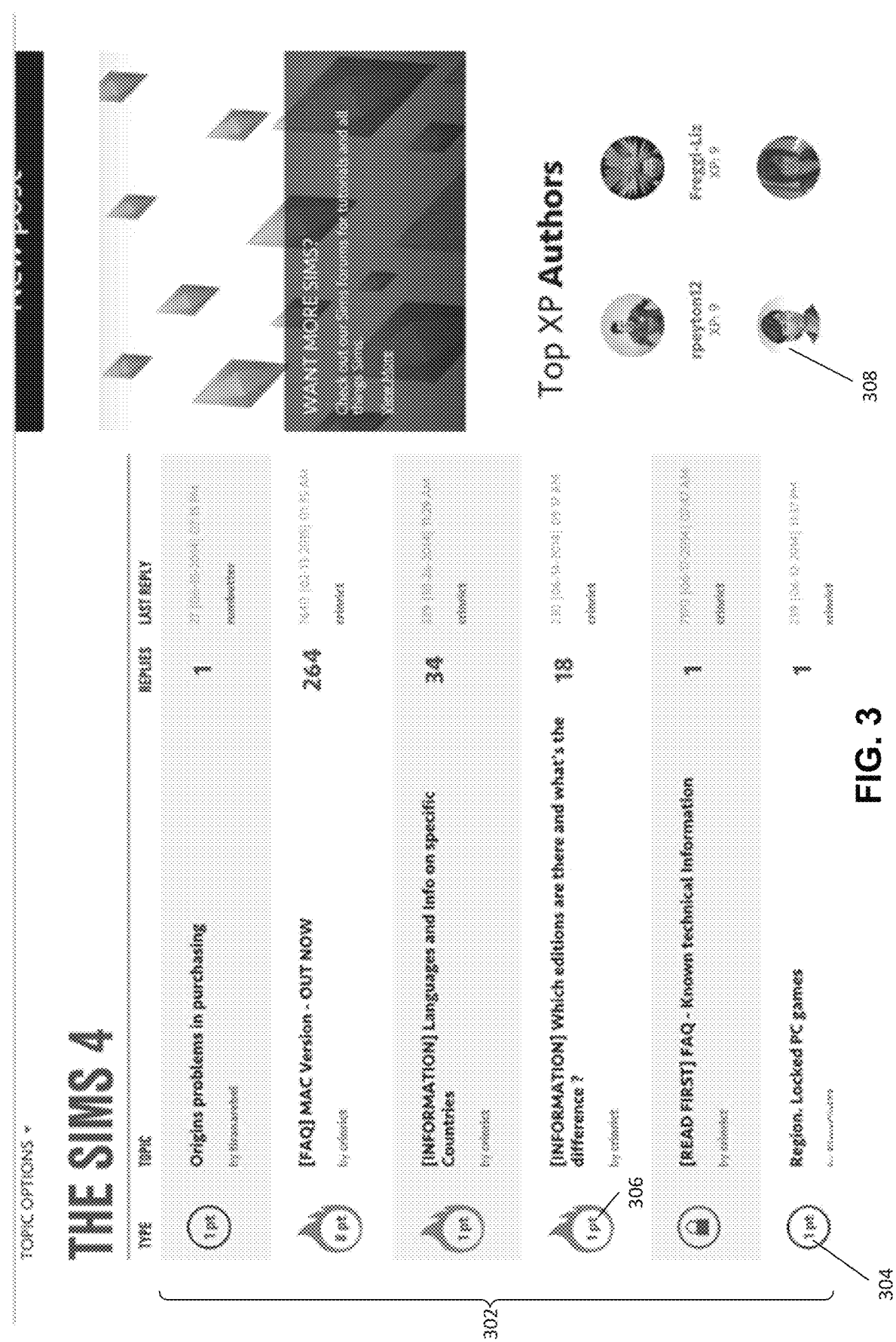
FIG. 3 illustrates an embodiment of a user interface of a content platform.

FIG. 3 illustrates an embodiment of an interface generated from instructions from a content platform. As illustrated in FIG. 3, the content platform may host a forum or message board. The example forum includes links to a plurality of displayed threads 302, each thread being associated with a title, an initial post by a first user (for example, first user 101a), and zero or more additional posts (also referred to as "replies") by additional users (for example, additional users 101b). Each thread of threads 302 can be considered to be a piece of content posted to the platform and stored as data objects on the system or in a database.

In some embodiments, at least some of the threads 302 may be associated with a point value 304. In some embodiments, a type of a thread may determine whether a point value is assigned to the thread. For example, a thread corresponding to a content request may be associated with a point value, whereas a thread corresponding to an announcement may not be associated with a point value. In addition, a thread corresponding to a content request that has been satisfied may also not be associated with a point value. In some embodiments, the user interface may include instructions to display the point values associated with the threads, which may be displayed in close proximity to each thread (for example, to the side of the thread, such as in 304).

In some embodiments, certain threads may be marked as being a priority thread (such as, a popular or a "hot" thread), based at least in part upon a point value associated with the thread. For example, a thread can be designated as a priority thread if the point value associated with the thread exceeds a threshold value. In some embodiments, a thread may be marked based upon other factors such as, for example, number of views of the thread, number of replies to the thread, and/or the like) or an aggregation of multiple factors (for example, a ratio between the point value of the thread and an age of the thread). In some embodiments, when a particular thread is marked as being popular or "hot," the user interface may include a visual effect 306 associated with the thread, such that it can be easily identified by users of the platform. In some embodiments, the user interface may include interface tools programmed to sort threads by associated point values and/or their status as priority threads, in order to visually convey to the user which types of content is in greatest demand.

In some embodiments, the interface may also display icons 308 corresponding to one or more users of the platform. The users may be displayed based upon rankings or values associated with the users.

Although the present specification illustrates embodiments of solution content in response to forum threads, it is understood that content may comprise any type of content that may be submitted by a user of the content platform. For example, a content platform may accept submissions of media files or other types of content from one or more users, and award point values to the users based upon a perceived quality of the submitted content.

Accumulating Point Values and Value Criteria

In order to incentivize the creation of certain types of content, the point value to be awarded may be calculated based upon a perceived need or demand for the content. For example, a first content corresponding to a content request (for example, a forum thread posing a question) may be associated with replies, "likes," and/or "me-too"s from additional users, indicating an increased demand for response content. In addition, the first content may be considered to have higher demand based at least in part upon an age of the first content, a status of the user that submitted the first content, a location on the content platform associated with the first content, and/or other factors. In some embodiments, point values are calculated using one or more content criteria, which may be generated using a value module 203, such as illustrated in FIGS. 2A and 2B. The mode of calculating the point values may be predetermined or may be determined in real-time using real-time data sources such as demand calculated for the content.

In some embodiments, the accumulated point value associated with the first content can be calculated as a weighted sum of one or more factors. The factors may be weighted in a linear or a non-linear manner. For example, the weight of a factor corresponding to a number of replies by other users to the first content may increase linearly as the number of replies increases. On the other hand, a weight of an age factor corresponding to an age of the first content may increase non-linearly with time (for example, a rate at which the weight of the factor increases is faster when the first content is still new, but decreases the more the first content ages). In some embodiments, how different factors are weighted may be based upon one or more properties of the first content (for example, a location in the online community to which the first content was posted) and/or one or more properties of the user who posted the first content (for example, a ranking status of the user).

A content platform may be associated with different types of content, and may be configured to incentivize different types of content differently. In some embodiments, different types of content can be associated with different subsets of platform content of the platform, also referred to as a category or location. For example, a platform corresponding to forum may be divided into a plurality of sub-boards. Each sub-board may correspond to a different topic, a particular type of content, and/or the like. For example, a particular forum may be associated with a particular topic or entity (for example, a video game publisher), wherein a sub-board is associated with a sub-topic or sub-entity relating to the topic or entity (for example, a sub-board may be associated with a game published by the video game publisher). In some embodiments, one or more sub-boards may also be associated with a type of content contained within the sub-board (for example, Announcements, Guides, Frequently Asked Questions, and/or the like). In some embodiments, categories of content on the platform may be referred to as a "taxonomy level" of the content.

Figure 4:
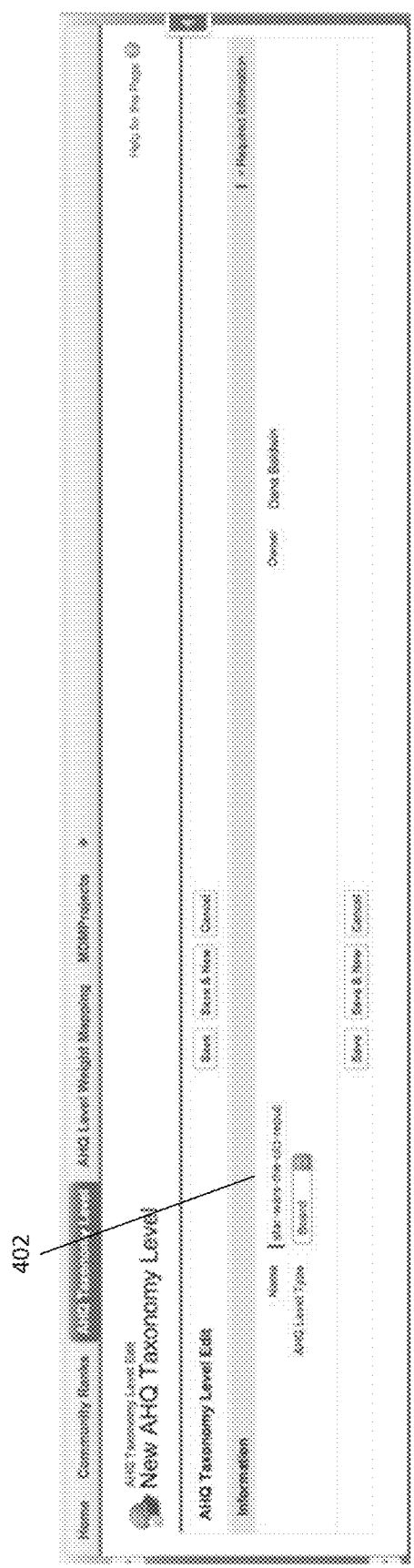
FIG. 4 illustrates an embodiment of a user interface for creating a sub-board in a forum.

FIG. 4 illustrates an example interface for creating a sub-board in a forum. In one embodiment, at 402, a user may specify a name for the new sub-board. The name of the sub-board may reflect a topic of the sub-board, and/or a type of content to be posted to the sub-board. In some embodiments, a new sub-board can be a sub-board of an existing sub-board.

Figure 5:
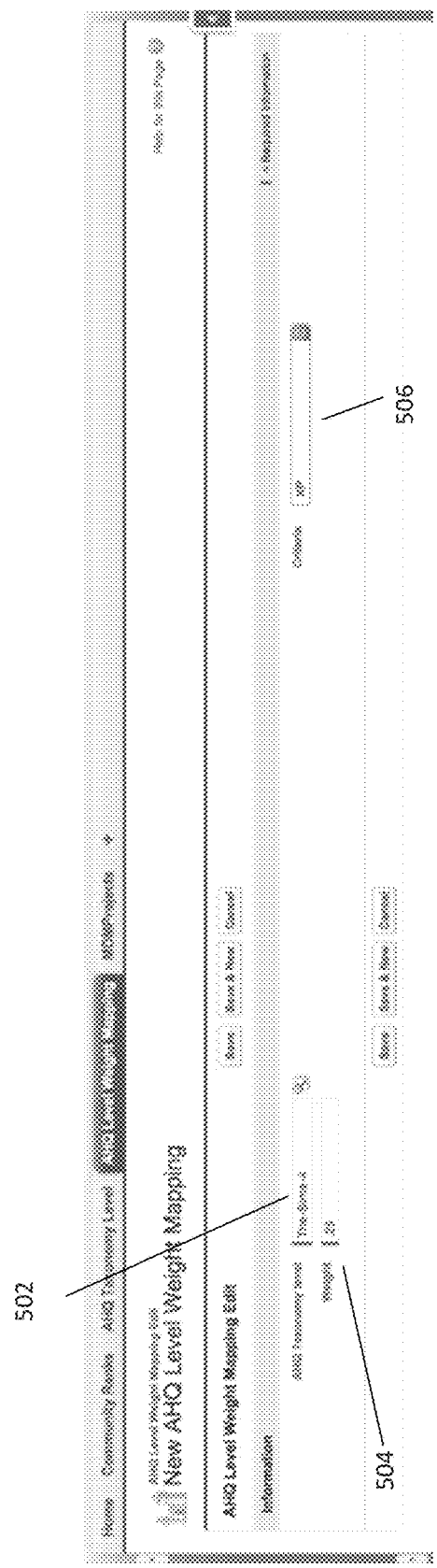
FIG. 5 illustrates an embodiment of a user interface for determining factors for a content platform.

FIG. 5 illustrates an example interface for a specifying a factor for calculating a value associated with content, in accordance with some embodiments. For each factor, the user may set a taxonomy level of the factor (at 502), an attribute or criteria associated with the factor (at 504), and a weight of the factor (at 506). For example, as illustrated in FIG. 5, the factor is associated with "The Sims 4" sub-board taxonomy level, an XP attribute (corresponding to an accumulated point value, or "experience points," of a user that the first content is associated with), and a weight of 0.25. As such, for a first piece of content posted on the "The Sims 4" sub-board of the platform by a first user, the value associated with the content will increase by 0.25 points for each XP associated with the first user.

In some embodiments, how a point value associated with a first content is calculated may be different depending upon the taxonomy level of the first content. For example, a video game publisher may desire to incentivize creation of content for particular sub-boards over other sub-boards. For example, a sub-board corresponding to a new product release—can receive higher point values than sub-boards for older releases. As such, point values associated with content in the priority sub-boards may be higher or accumulate faster (for example, the weights for one or more factors may be higher) compared to other sub-boards.

In addition, the factors used to calculate a point value for content on a first sub-board may be different than for content on a second sub-board. For example, the first sub-board may include factors configured to consider age of the content request as a factor in calculating a point value associated with the content request, while the second sub-board may be configured to not consider age as a factor. In some embodiments, a particular sub-board may be configured to not be associated with accumulated values at all. For example, content on a sub-board for announcements may not be associated with any point values.

In some embodiments, the point value is calculated as a function (for example, a weighted sum) of a plurality of different factors. Each factors may be associated a taxonomy level, an attribute or criteria associated with the factor, and a weight. As mentioned above, a factor can be associated with a specific taxonomy level indicating a location on the online platform factor is associated with. For example, for a platform corresponding to a forum, the taxonomy level may indicate a sub-board that the factor is associated with. As such, the factor associated with a particular taxonomy level may be used for calculating point values associated with first content on the sub-board that the factor is associated with, and may not be used for calculating point values for content requests on other sub-boards.

The factor may refer to a factor associated with a first content or a user that the first content is associated with that can be used to calculate the point value for the first content. For example, factors may include a number of replies by other users to the first content, number of "me too" responses to the first content, time since the first content was created, a property of the user who posted the first content, and/or the like.

Weight may refer to a weighting factor applied to the attribute value when determining the factor for calculating a point value for a content request. In some embodiments, the weight may simply be a scalar value applied to the attribute value. In other embodiments, the weight may comprise a function based upon the attribute value (for example, a step function).

In some embodiments, the platform may be configured to associate each taxonomy level (for example, sub-board) of the platform with different factors corresponding to different weights. When calculating a point value associated with a submitted first content, a taxonomy level of the first content can be identified (for example, which sub-board the first content was posted to). Factors associated with the matching taxonomy level can be identified. The value can be associated with the first content (for example, number of replies, age of content) are retrieved and aggregated in accordance with their respective weights as defined by the identified factors.

Figure 6:
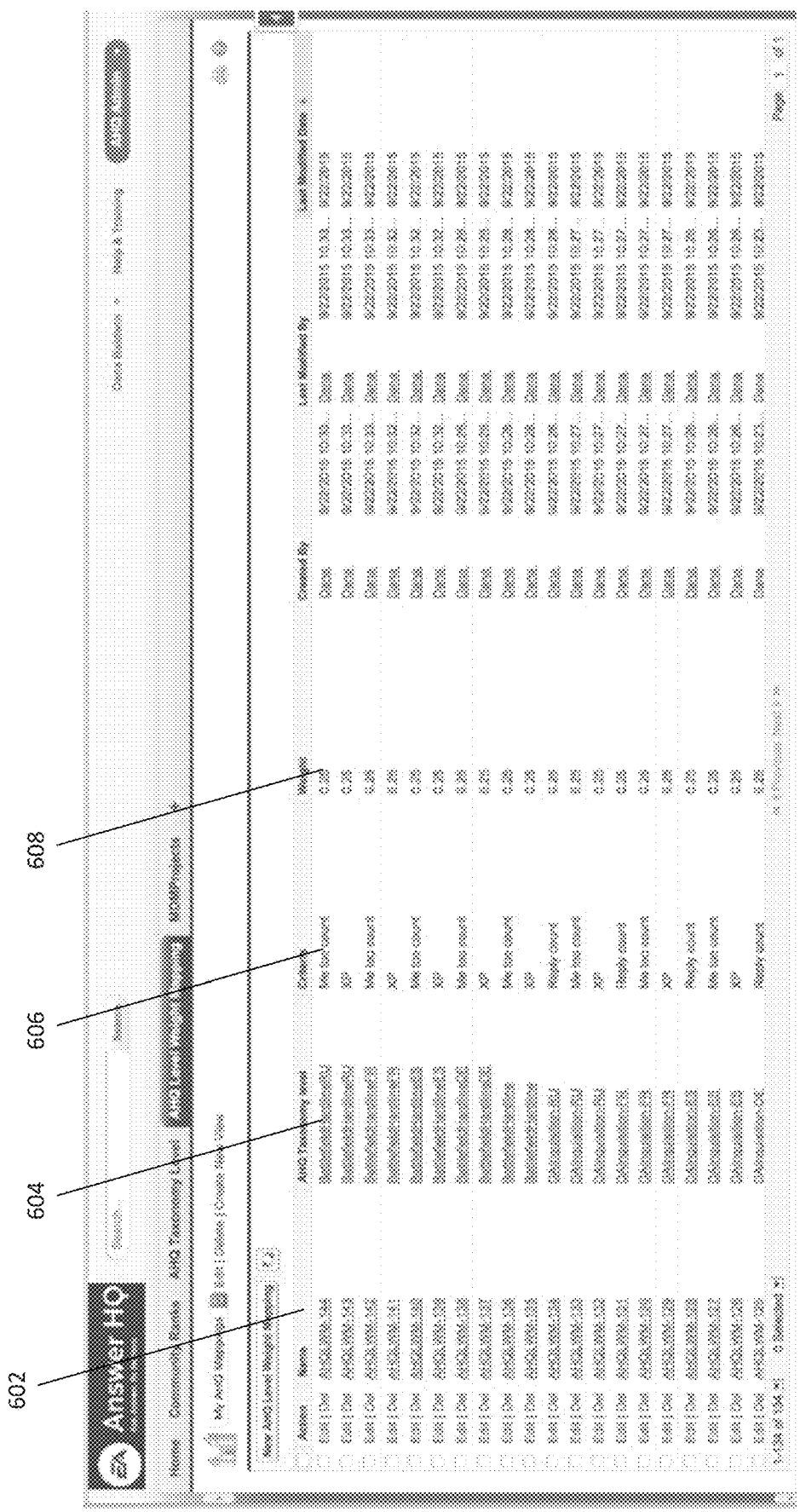
FIG. 6 illustrates an embodiment of a user interface for displaying a plurality of created factors.

FIG. 6 illustrates an embodiment of a user interface for displaying a plurality of created factors. In one embodiment, each factor may be associated with a factor name (602), a taxonomy level (604), a criteria (606), and a weight (608). In addition, the user interface may display additional information for each factor, such as user who created the factor, user who last modified the factor, a last modification date, and/or the like. When a first content is received by the platform associated with a particular taxonomy level (for example, "BattlefieldHardlineDE"), factors associated with that taxonomy level may be identified, and attribute values associated with the first content (for example, "XP", "Me too count") can be retrieved and aggregated in accordance with the weights associated with the identified factors.

In some embodiments, the interfaces illustrated in FIGS. 4-6 may be accessed by an administrator or other user of the content platform in order to generate value criteria for the content platform. The interfaces may be associated with a value module, such as value module 205 as illustrated in FIGS. 2A and 2B, and the generated value criteria comprising one or more factors may be stored as value criteria 115 as illustrated in FIG. 1.

Point Value Process Flow

Figure 7:
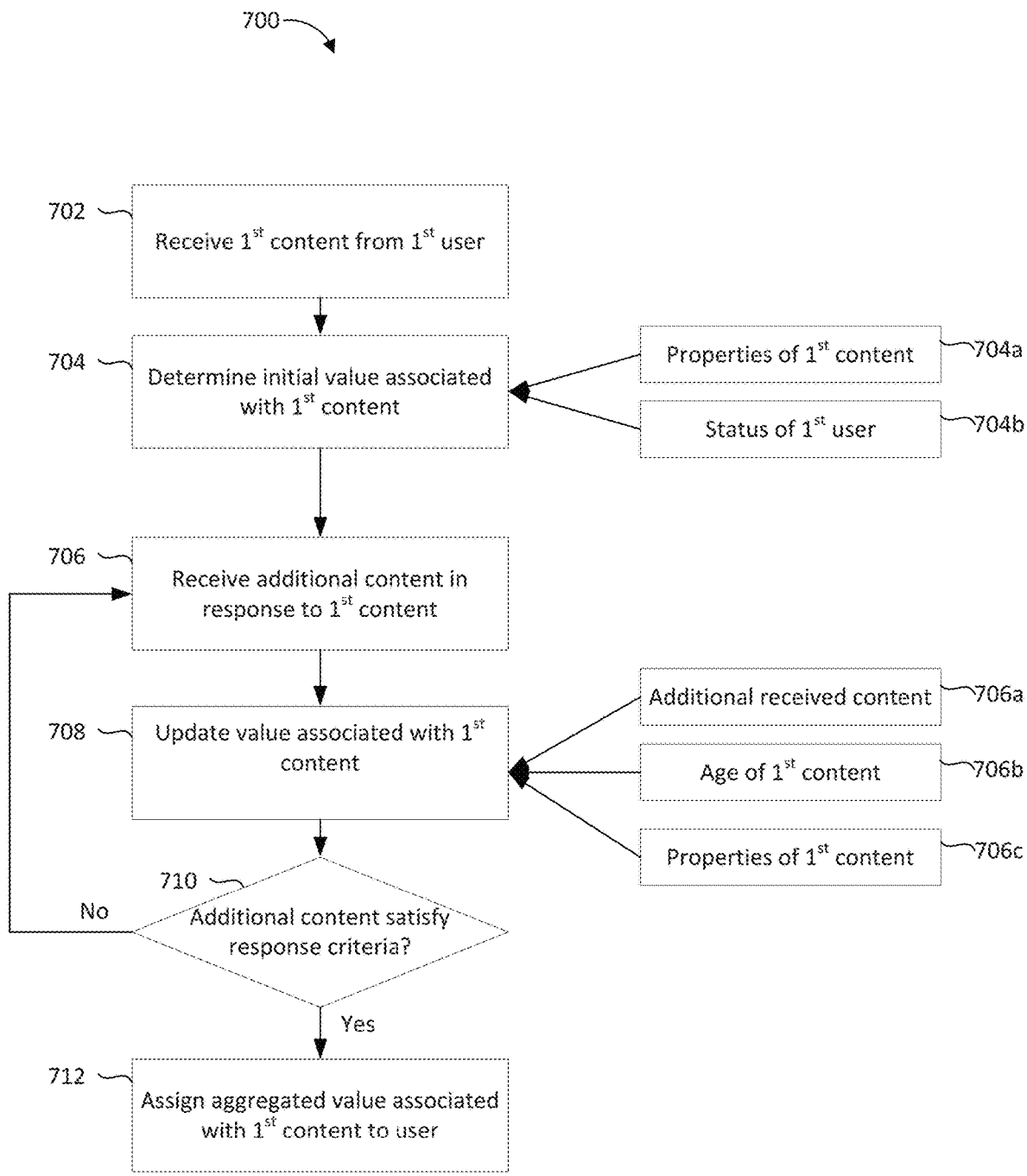
FIG. 7 is an embodiment of a flowchart for a process for determining a value of submitted content.

FIG. 7 illustrates a flowchart for an embodiment of a process 700 for accumulating and awarding point values to users for submitted content. The process 700 can be implemented by any system that can manage a content platform in a network-based environment. For example, the process 700, in whole or in part, can be implemented by the content platform 105, the value module 205, the ranking module 207, or other computing system. Although any number of systems, in whole or in part, can implement the process 700, to simplify discussion, the process 700 will be described with respect to the content platform 105.

At block 702, a first content is received from a first user. In some embodiments, the first content may be a post or new thread in a message board or forum, and may correspond to a request for response content. For example, the first content may contain a question or discussion prompt that other users of the platform are able to reply to.

At block 704, an initial value associated with the first content is determined. In some embodiments, the initial value may correspond to a default value (for example, one point). In some embodiments, the initial value may be calculated based upon one or more factors. These may include one or more properties of the first content (block 704a), such as the content of the first content or a taxonomy level associated with the first content, and/or one or more properties of the first user that provided the first content (block 704b), such as a rank of the first user. Value may be represented in a variety of ways such as, for example, experience points, a number, a color scheme, a graphic and so forth.

At block 706, additional content in response to the first content is received. The additional content may comprise replies to the first content. For example, if the first content is a forum post, the additional content may comprise replies and/or "me-too"s posted by other users in reply the first content. In addition, the additional content may correspond to a solution to a question or request posed by the first content (for example, response content).

At block 708, the value associated with the first content is updated. The value associated with the first content may be updated based upon a plurality of different factors. For example, the value may be calculated as a weighted sum of the plurality of factors. These factors may include additional content received in response to the first content (block 706a), an age of the first content (block 706b), one or more properties of the first content (block 706c) such as a taxonomy level of the first content, and/or the like. For example, additional received content such as replies and/or "me-too"s posted by other users in reply the first content may indicate a higher degree of interest in the first content by users of the platform, resulting in a higher accumulated value associated with the first content. In addition, the platform may be configured to incentivize content submission in response to older content and/or certain types of content. As such, the accumulated value may increase with the age of the first content. In addition, how these factors are weighed may be based upon the taxonomy level of the first content object (for example, which sub-board the first content was posted to) and other factors stored in the system. In some embodiments, one or more of these factors may influence the accumulated value in a linear or a non-linear manner. As time passes and/or additional content is received from other users, the process may continually update the value associated with the first content.

At block 710, a determination is made as to whether any of the additional content satisfies one or more criteria. In some embodiments, the criteria may comprise an indication of acceptance of the additional content. For example, where the first content comprises a content request by the first user, the first user may review the additional content and accept a piece of the additional content generated by a different user as satisfying the request (for example, by clicking an "accept solution" button associated with a submitted piece of content). In some embodiments, the content may be deemed accepted based upon inputs by other users of the online platform (for example, other users of the online platform can vote for a "best answer"). In some embodiments, the content platform can automatically determine whether the content satisfies the response criteria.

If none of the additional content satisfies the criteria, the process may return to block 706, where additional content in response to the first content may be received. In addition, the accumulated value associated with the first content may continue to be updated (at block 708).

At block 712, if a piece of the additional content (hereinafter referred to as the "accepted content") is determined to satisfy the criteria, the value associated with the first content is awarded to a user associated with the accepted content. In some embodiments, the first content may be closed from receiving additional associated content. For example, where the first content corresponds to a forum thread, the thread may be closed to prevent further replies from other users. In addition, the system may be configured to generate instructions to recategorize and/or to display the thread in a different sub-board of the forum (for example, a "completed requests" or "answered questions" sub-board). In some embodiments, a visual effect may be applied to the accepted content, in order to mark it as an "accepted solution."

User Ranks

Figure 8:
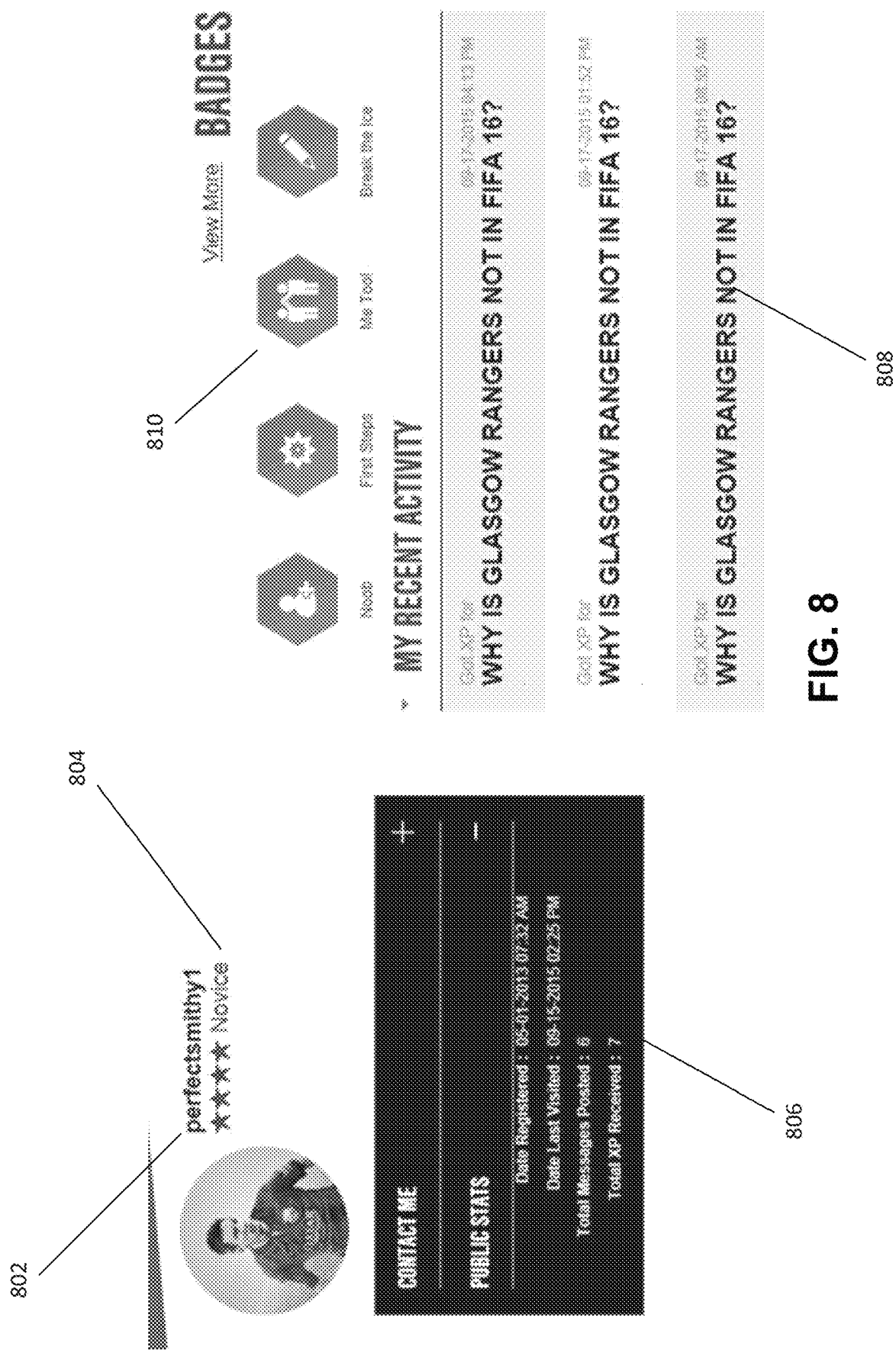
FIG. 8 illustrates an embodiment of a user interface illustrating a user profile on an online platform.

FIG. 8 illustrates an example interface showing a user profile on an online platform. In one embodiment, after the user 802 submits accepted content, the user may acquire point values. The point values that have been accumulated by the user may be displayed as XP ("experience points") at 806. In some embodiments, XP can be earned in other ways, such as by performing certain types of activities on the content platform.

In some embodiments, the total XP accumulated by each user may be viewed by other users. For example, as illustrated in FIG. 3 at 308, users having the largest amount of accumulated XP may be ranked and displayed on the online platform. This may serve as a source of recognition and incentivize the users into submitting content and accumulating XP. The user profile may also display additional information for the user 802, such as posted messages and links to most recently posted messages 808, and badges 810 that have been earned by the user. Value may be represented in a variety of ways such as, for example, experience points, a number, a color scheme, a graphic and so forth.

As users of the platform submit content, the system may track and/or store the point values they have accumulated. In some embodiments, in order to further incentivize users to submit content, the online platform can be configured such that as users accumulate additional point values, they may obtain additional rank and/or privileges on the online platform. As the user's accumulated point values increase, the user may acquire new ranks at predetermined intervals. For example, a user may reach the rank of "Novice" after acquiring five points, and the rank of "Journeyman" after reaching fifteen points, and so on. The rank or status of the user may be reflected by a ranking 804 displayed in the user's profile. In some embodiments, a user may be able to "spend" accumulated points in order to gain perks and/or privileges (for example, additional graphics displayed in their profile, access to an exclusive sub-board, and/or the like).

In some embodiments, the ranking of a user may be based upon one or more additional factors. The additional factors may be indicative of other types of activities that may be performed by the user on the platform. For example, additional factors that may be used to calculate a ranking for the user may include total number of posts by the user, a level of user activity on different taxonomy levels (for example, sub-boards) of the platform, and/or the like. In some embodiments, each ranking factor may be associated with an attribute (for example, total accumulated point value of the user, total posts of the user, and/or the like) and a weight, such that a rank of a user can be calculated as a weighted sum of the factors. In other embodiments, the rank of a user may be calculated using other types of functions and/or criteria. The factors and functions used to calculate rank may be generated using a ranking module, such as ranking module 207 as illustrated in FIGS. 2A and 2B, and stored as ranking criteria 117 as illustrated in FIG. 1.

In some embodiments, the specific factors and formula used to calculate a user's rank may be hidden from the user, such that the user cannot readily determine the specific activities needed to achieve the next rank. This may be done to incentivize the user to participate in the online community without focusing only on the specific activities needed to achieve the next rank.

In some embodiments, the ranking of a user may be based upon a comparison to other users (for example, a "VIP" rank that can be associated with a defined number of users of the online platform having the defined aggregated point count). In other embodiments, a rank for a user is determined independently of other user's data.

In some embodiments, a user's rank can be used to determine one or more privileges available to the user on the platform. For example, on a forum platform, a user having a certain rank or above may be able to post certain types of content (for example, announcements, blog posts, hangouts, and/or the like) or be given access to certain sub-boards of the forum or other secured areas of the platform.

In some embodiments, a user may also be awarded badges for performing specific activities on the online platform, which may be displayed on the user's profile. For example, the user may receive a "Break the Ice" badge for their first message posted on the online platform, a "Helper" badge for having submitted at least five accepted pieces of content to content requests posted by other users, a "Topic Master" badge for having submitted accepted pieces of content to sub-boards covering particular topics, and/or the like. In some embodiments, one or more badges may be awarded to a user randomly based upon performance of certain activities by the user. For example, when a user submits solution content to a content request that is accepted, there may be a probability (for example, 25%) that they are awarded a particular badge. Alternatively, a particular badge may be awarded to every ten (or other integer amount) users that perform a specific activity. In some embodiments, when a user receives a new badge, the system may also award the user a predetermined amount of XP associated with the badge.

User Rank Process Flow

Figure 9:
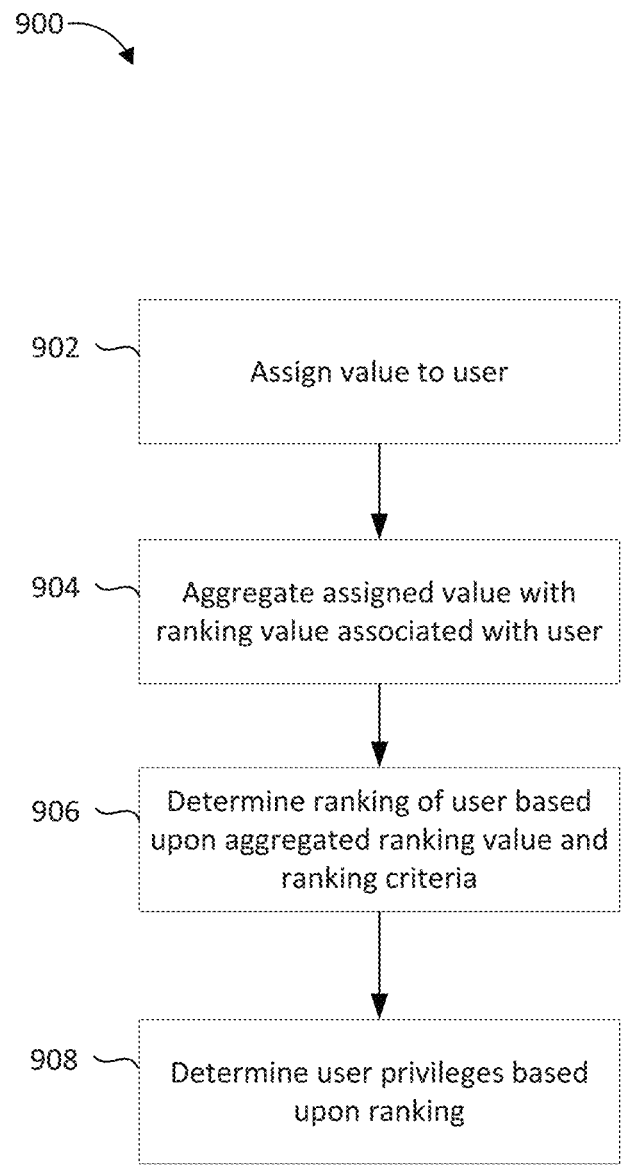
FIG. 9 is an embodiment of a flowchart for a process for determining user rank.

FIG. 9 is illustrates an embodiment of a flowchart of a process for determining user rank. The process 900 can be implemented by any system that can manage user profiles for a content platform in a network-based environment. For example, the process 900, in whole or in part, can be implemented by the content platform 105, the ranking module 207, or other computing system. Although any number of systems, in whole or in part, can implement the process 900, to simplify discussion, the process 900 will be described with respect to the content platform 105.

At block 902, a value is assigned to the user. For example, the value may have been assigned to the user in response to the user submitting content that met certain criteria (for example, see FIG. 7).

At block 904, the assigned value is aggregated with a ranking value associated with the user (for example, an XP value). The ranking value may correspond to point values previously awarded to the user (for example, for submitting accepted content). In some embodiments, the aggregation may comprise a simple summation. As such, the ranking value will reflect the total point value that has been awarded to the user.

At block 906, a ranking for the user is determined, based at least in part upon the ranking value and one or more ranking criteria. For example, the ranking criteria can specify threshold ranking values associated with each rank, whereupon the ranking for the user is determined by comparing the ranking value of the user profile with the threshold values.

In some embodiments, determining a ranking for the user may further be based upon one or more additional factors associated with user activity on the online platform. For example, these may include a number of posts by the user, a number of "friends" of the user, and/or the like.

At block 908, one or more user privileges are determined based upon the ranking of the user. For example, users that have reached a certain rank may be able to submit or access certain types of content on the online platform. In addition, one or more graphics indicative of the user's ranking may be displayed on a profile associated with the user.

Overview of Computing Device

FIG. 10 illustrates an embodiment of computing device 10 according to the present disclosure. Other variations of the computing device 10 may be substituted for the examples explicitly presented herein, such as removing or adding components to the computing device 10. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, a server, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A content aggregation and assessment computing system comprising:
   an account data store storing a set of user profiles for a plurality of users, wherein each user profile is associated with a user;
   a rules data store storing a set of value calculation factors and a set of response criteria; and
   a content hosting platform comprising:
      at least one processor in electronic communication with the account data store and the rules data store;
      a content platform module comprising instructions that when executed by the at least one processor generate a network-based content platform associated with at least one game application; and
      a content valuation module comprising instructions that when executed cause the content hosting platform to:
         receive an initial content object generated by a first user, the first user associated with a first user profile of the set of user profiles;
         determine an initial value of the initial content object based, at least in part, on information associated with the first user profile and at least one value calculation factor of the set of value calculation factors;
         for each response to the initial content object:
            receive a response content object in response to the initial content object from a second user, wherein the second user is associated with a second user profile of the set of user profiles;
            determine a response value of the response content object based at least in part on the at least one value calculation factor;
            increment a total content value of the initial content object to include the response value of the response content object, wherein the total content value includes an aggregate total of the initial value of the initial content object and response values of each response content object;
            determine whether response content of the response content object satisfies a response criteria associated with the initial content object of the set of response criteria;
            in response to determining that the response content satisfies the response criteria, award the total content value to the user profile associated with the response content that satisfied the response criteria; and
            in response to determining that the response content does not satisfy the response criteria, continually update the total content value of the initial content object based, at least in part, on the set of value calculation factors and the response values of each response content object until a subsequent response content object satisfies the response criteria.

2. The content aggregation and assessment computing system of claim 1, wherein the content platform corresponds to an online message board associated with the at least one game application, and wherein the initial content object is a post associated with the online message board.

3. The content aggregation and assessment computing system of claim 1, wherein the content valuation module further comprises instructions to receive a plurality of response content objects prior to determining a response object of the plurality of response content objects satisfies the response criteria associated with the initial content object.

4. The content aggregation and assessment computing system of claim 3, wherein the content valuation module further comprises instructions to update the total content value for each response content object received.

5. The content aggregation and assessment computing system of claim 1, wherein the initial content object comprises a request for solution content, and wherein the response content object comprises solution content in response to the initial content object.

6. The content aggregation and assessment computing system of claim 1, wherein the content valuation module further comprises instructions to:
- update a ranking for the second user profile by augmenting a ranking value associated with the second user profile by the total content value; and
- determine one or more privileges associated with the second user, based at least in part upon the updated ranking.

7. The content aggregation and assessment computing system of claim 1, wherein the at least one value calculation factor includes a taxonomy level associated with the initial content object.

8. The content aggregation and assessment computing system of claim 7, wherein a weight is associated with the at least one value calculation factor and is based at least in part upon a taxonomy level associated with the initial content object.

9. The content aggregation and assessment computing system of claim 1, wherein the at least one value calculation factor includes an amount of time elapsed after receipt of the initial content object.

10. A computer-implemented method for automated assessment and valuation of content comprising:
by a computing system configured to execute a network-based content platform,
- receiving a first content object generated by a first user, the first user associated with a first user profile;
- determining a content value of the first content object based, at least in part, on information associated with the first user profile and at least one value calculation factor;
- receiving at least one response content object in response to the first content object from at least one user different from the first user, wherein each response content object is associated with a user profile;
- for each of the at least one response content objects,
  - determining a response value for the response content object based, at least in part, on the at least one value calculation factor;
  - increment a total content value of the first content object to include the response value of the response content object, wherein the total content value is based at least in part on an initial value of the first content object and response values of each of the at least one response content objects;
  - determining whether response content of the response content object satisfies a response criteria associated with the first content object;
  - in response to determining that the response content satisfies the response criteria, assigning the total content value of the first content object to the user profile associated with the response content object that satisfied the response criteria; and
  - in response to determining that the response content does not satisfy the response criteria, continually update the total content value of the first content object based, at least in part, on the at least one value calculation factor and the response values of each response content object until a subsequent response content object satisfies the response criteria.

11. The computer-implemented method of claim 10, wherein the at least one value calculation factor includes a taxonomy level associated with the first content object.

12. The computer-implemented method of claim 11, wherein a weight associated with a factor of the set of value calculation factors is based at least in part upon a taxonomy level associated with the first content object.

13. The computer-implemented method of claim 10, wherein the at least one value calculation factor includes an amount of time elapsed after receipt of the first content object.

14. The computer-implemented method of claim 10 further comprising updating a ranking for the user profile associated with the response content object that satisfied the response criteria by augmenting a ranking value by the total content value.

15. The computer-implemented method of claim 14, wherein a weighting factor is applied to the total content value prior to augmenting the ranking value by the total content value.

16. The computer-implemented method of claim 14, further comprising determining one or more privileges associated with the user profile that satisfied the response criteria, based at least in part on the updated ranking.

17. The computer-implemented method of claim 14, wherein determining whether the response content object satisfies a response criteria associated with the first content object is performed automatically.

18. A non-transitory computer-readable medium comprising computer-executable instructions for content aggregation and assessment that, when executed by a computing system, causes the computing system to:
- receive a first content object generated by a first user, the first user associated with a first user profile;
- determine a content value of the first content object based, at least in part, on information associated with the first user profile and at least one value calculation factor;
- receive at least one response content object in response to the first content object from at least one user different from the first user, wherein each response content object is associated with a user profile;
- for each of the at least one response content objects,
  - determining a response value for the response content object based, at least in part, on the at least one value calculation factor;
  - increment a total content value of the first content object to include the response value of the response content object, wherein the total content value includes an aggregate total of an initial value and response values of each response content object;
  - determining whether response content of the response content object satisfies a response criteria associated with the first content object;
  - in response to determining that the response content satisfies the response criteria, assigning the total content value of the first content object to the user profile associated with the response content object that satisfied the response criteria; and
  - in response to determining that the response content does not satisfy the response criteria, continually update the total content value of the first content object based, at least in part, on the at least one value calculation factor until a subsequent response satisfies the response criteria.

19. The computer-readable medium of claim 18 further comprises computer-executable instructions that cause the computing system to update a ranking for the user profile associated with the response content object that satisfied the response criteria by augmenting a ranking value associated with the user profile by the total content value.

20. The computer-readable medium of claim 19 further comprises computer-executable instructions that cause the computing system to apply a weighting factor to the total content value prior to augmenting the ranking value by the total content value.

* * * * *